Fig. 2

■ = MAJOR TRANSITION – DRUM DOES NOT STOP ON THESE POINTS

TOTAL R = TOTAL RESISTANCE IN EACH NETWORK RN1, RN2 AND RN3

Inventor
William H. Rouse
By H R Rather
Attorney

March 21, 1961 W. H. ROUSE 2,976,468
MULTI-POSITION ELECTRICAL CONTROL
Filed Aug. 14, 1958 3 Sheets-Sheet 3
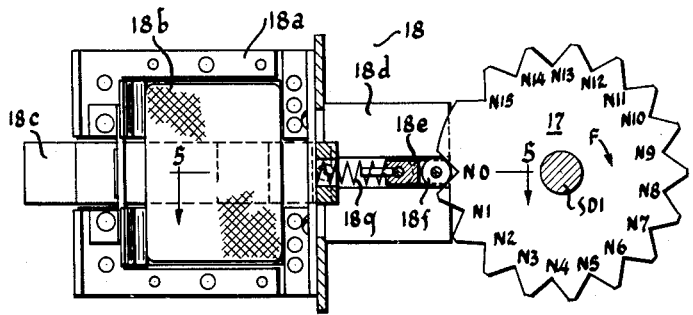
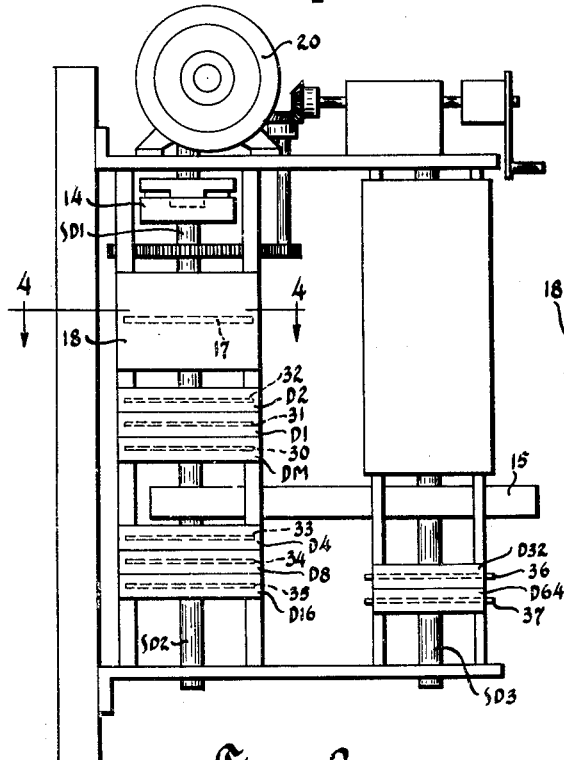
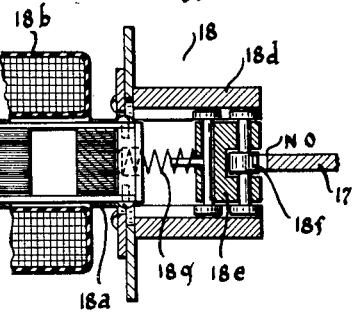
Inventor
William H. Rouse
By H R Rather
Attorney

United States Patent Office 2,976,468
Patented Mar. 21, 1961

2,976,468
MULTI-POSITION ELECTRICAL CONTROL

William H. Rouse, Brookfield, Wis., assignor to Cutler-Hammer, Inc., Milwaukee, Wis., a corporation of Delaware Filed Aug. 14, 1958, Ser. No. 754,981

13 Claims. (Cl. 318—138)

This invention relates generally to electrical controllers. More particularly, it relates to rotary shaft, multi-position types of controllers which are adapted to control the speed of a driving motor of a printing press.

The present invention relates to and incorporates improvements over types of electrical controllers similar to that disclosed in Jochem Patent No. 2,672,579, issued March 16, 1954, to the assignee of the instant application.

It is an object of this invention to provide a controller which, in conjunction with a preferred type of network of external resistors, is adapted to effect commutation of such resistors in a multiplicity of steps, such as will afford a great number of definite operating speeds for a wound rotor induction motor with a substantial reduction in the number of external resistors and circuit wiring required.

Another object is to provide an improved controller which affords a desirable change in resistance taper while retaining a repetitive, consistent and relatively simple schedule for the sequence in which said resistors are commutated.

Still another object is to provide improved means for controlling the secondary resistance in circuit with a polyphase, alternating current, induction type, wound rotor motor to afford balance between the values of resistance in each network in circuit with each of the phase windings of such a motor at any speed point thereof.

A further object is to provide an improved controller wherein the values of the resistors in each network and their arrangement is such that in effecting commutation thereof over one portion of the full range the difference in value of the resistance between each step varies by a predetermined amount and over another portion of the range of the difference in value of the resistance between each step varies by an amount which is some function of said predetermined amount.

A still further object is to provide an improved controller of the aforesaid character which comprises improved means for accurately positioning and locking the controller at each speed point thereof.

An even further object is to improve the details of construction and operation of the various component parts of a controller of aforementioned character.

Other objects and advantages of the invention will hereinafter appear.

The accompanying drawings illustrate a preferred embodiment of the invention which will now be described, it being understood that the embodiment shown is susceptible of modification in respect of its details without departing from the scope of the appended claims.

In the drawings:

Fig. 2 is a table indicating a preferred sequence for commutating the resistance in one branch of the external secondary resistance for a wound rotor induction motor shown in Fig. 1;

Fig. 3 shows more or less schematically a preferred form of motor operated drum controller for effecting the commutation set forth in Fig. 2;

Fig. 4 is a top plan view taken substantially along the line 4—4 of Fig. 3 showing certain details of the positioning and locking mechanism of the drum controller; and Fig. 5 is a sectional view taken along the line 5—5 of Fig. 4.

Figure 1:
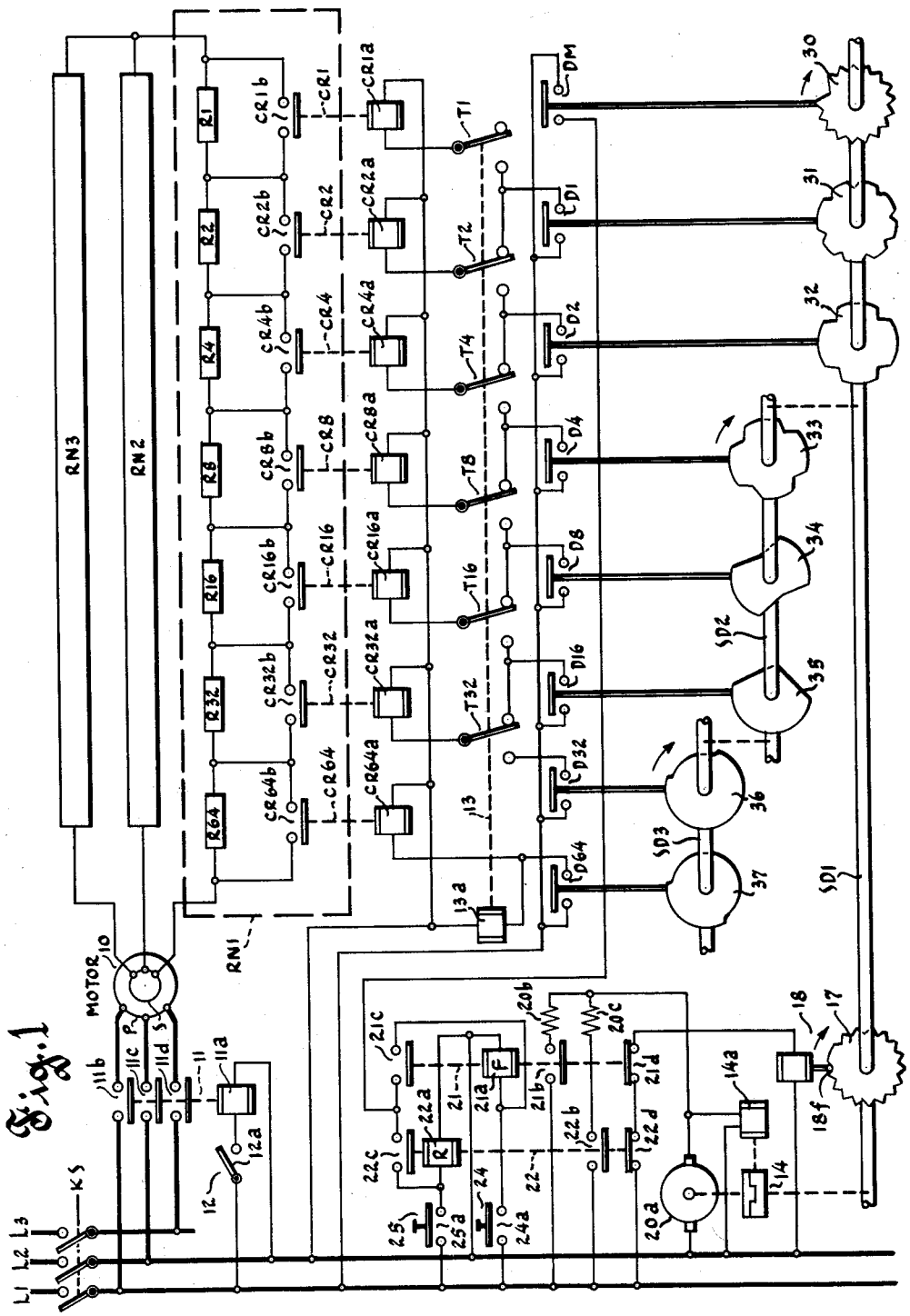
Figure 1 is a showing, partly diagrammatic and partly schematic, of a control system employing the invention.

Referring to Fig. 1, the numeral 10 designates an alternating current, polyphase, wound rotor induction motor which may be assumed, for purposes of illustration, to be adapted to drive a printing press (not shown). The primary winding P of motor 10 is supplied with power from a power supply source comprising the supply lines L1, L2 and L3 through a normally open manually operable disconnect knife switch KS and through the normally open contacts 11b, 11c and 11d of an electroresponsive contactor 11. The operating coil 11a of contactor 11 is connected on one side to line L2 and is connectable on its other side to line L1 through the normally open contact 12a of a manually operable switch 12. The coil 11a is adapted to be energized to effect closure of contacts 11b, 11c and 11d and to effect consequent energization of motor 10 in the event that the contact 12a of switch 12 is closed and maintained closed.

Star connected secondary resistance networks RN1, RN2 and RN3 are connected across the three phases, respectively, of the secondary winding S of motor 10. The speed of motor 10' is controlled by commutation of resistance in each of the phases of the secondary winding to afford a multiplicity of speed points. Resistance networks RN2 and RN3 are identical to RN1 and, therefore, are schematically depicted for the sake of simplicity. Each of the networks RN1, RN2 and RN3 will be understood to comprise seven resistors and a commutating contact is connected across each one of said resistors. More specifically, network RN1 comprises seven serially connected resistors designated R1, R2, R4, R8, R16, R32 and R64 whose resistance values may, for purposes of illustration, be assumed to be 1, 2, 4, 8, 16, 32 and 64 ohms, respectively. Thus, the total ohmic value of network RN1 with no resistor shunted is 127 ohms. If preferred, however, some other number of serially connected resistance units having ohmic values which vary in geometric progression may be employed, provided, of course, that suitable provisions are made therefor in the controller.

Seven electroresponsive commutating relays CR1, CR2, CR4, CR8, CR16, CR32 and CR64 are associated with resistance network RN1 and the normally open commutating contact CR1b, CR2b, CR4b, CR8b, CR16b, CR32b and CR64b, respectively, of each of the relays is connected across the resistors R1, R2, R4, R8, R16, R32 and R64, respectively. The commutating contacts of each of the relays which would normally be associated with the resistors (not shown) in the networks RN2 and RN3 have not been shown. Each commutating contact is adapted to close upon energization of its respective relay to shunt its respective resistor to thereby reduce the total ohmic value of resistance network RN1 by the ohmic value of the resistor shunted. One side of each of the operating coils CR1a, CR2a, CR4a, CR8a, CR16a, CR32a and CR64a of the hereinbefore mentioned commutating relays is connected to line L2. The other side of each of the operating coils CR1a, CR2a, CR4a, CR8a, CR16a and CR32a is connected to one side of the movable contact members T1, T2, T4, T8, T16 and T32, respectively, of an electroresponsive transfer relay 13.

The operating coil 13a of transfer relay 13 is connected in parallel with the operating coil CR64a of commutating relay CR64 and is energizable therewith, as will hereinafter appear.

There is provided a drum controller, more fully described hereinafter, which has eight drum switches DM, D1, D2, D4, D8, D16, D32 and D64 whose contacts are normally open. One side of the normally open contact of each of the drum switches is connected to line L1. The other side of the contact of drum switch D64 is connected to the other side of the aforementioned operating coil CR64a. When transfer relay coil 13a is deenergized, as shown in Fig. 1, the other sides of the aforementioned operating coils CR2a, CR4a, CR8a, CR16a and CR32a are connected through the movable contacts T2, T4, T8, T16 and T32, respectively, of transfer relay 13 to the other side of the contacts of the drum switches D1, D2, D4, D8 and D16, respectively. Note that the other side of operating coil CR1a is connected to the movable contact T1 of transfer relay 13 but that the movable contact T1 is disconnected from the contact of drum switch D1. When transfer relay coil 13a is energized in response to closure of the contact of drum switch D64, as will hereinafter appear, the transfer relay 13 operates to connect the other sides of the relay coils CR1a, CR2a, CR4a, CR8a, CR16a and CR32a to the other side of the contacts of the drum switches D1, D2, D4, D8, D16 and D32, respectively, through the movable contacts T1, T2, T4, T8, T16 and T32, respectively. The connection for the other side of the contact of drum switch DM will be more particularly described hereinafter.

Figure 2:
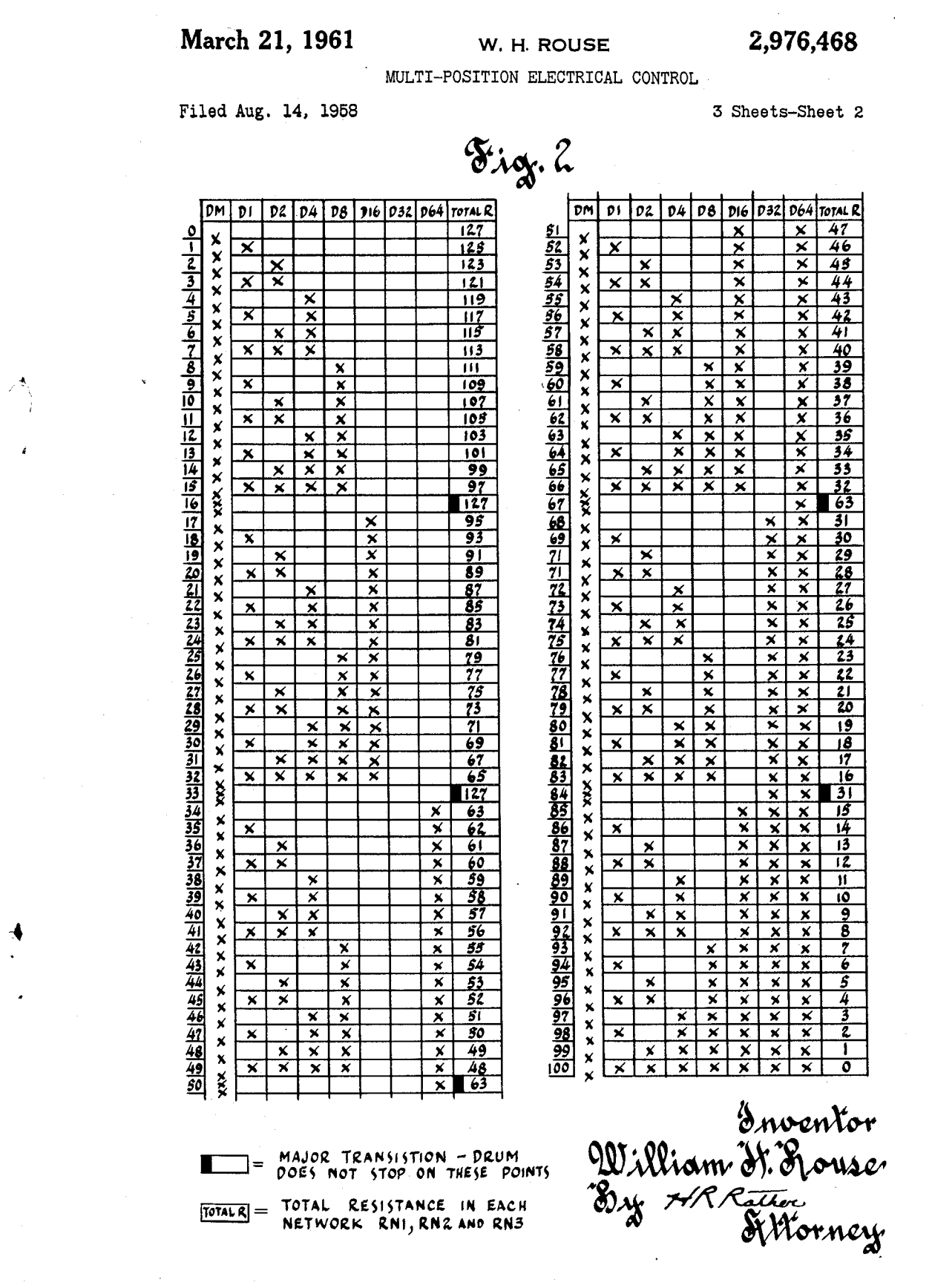

Fig. 2 shows a schedule for the commutation of the drum switches DM, D1, D2, D4, D8, D16, D32 and D64. As will hereinafter be more fully explained, although the drum controller is shown as having one hundred and one operating positions (0 through 100) it does not stop on positions 16, 33, 50, 67 or 84, which are points of major transition. Therefore, only ninety-five speed points are provided for motor 10 upon one complete operation of the drum controller in one direction. It will be noted that in passing from position 0 to position 34 the change in ohmic value for network RN1 between each operating position is two ohms but that in passing from position 34 to position 100 the change in ohmic value for network RN1 between each operating position is one ohm. This change in resistance taper at position 34 is effected by operation of transfer relay 13, as will hereinafter appear.

Figs. 1 and 3 together show the form of motor driven drum controller which is particularly adapted for effecting commutation of the drum switches DM, D1, D2, D4, D8, D16 and D64 in accordance with the commutation schedule of Fig. 2. An alternating current, split field pilot motor 20 is provided to drive a first drum shaft SD1 through the medium of appropriate speed reduction gearing (not shown) and an electroresponsive or solenoid clutch 14 in forward and reverse directions. It is to be noted that the use of solenoid clutch 14, which deenergizes to decouple pilot motor 20 from drum shaft SD1 when the pilot motor is deenergized, is particularly advantageous from the standpoint of mechainical life of the controller. As will hereinafter appear, when pilot motor 20 is decoupled from shaft SD1 less force is needed for a positioning device 18 to restrain a starwheel 17 disposed on shaft SD1 and less strain is imposed on the drum controller than would otherwise be the case. The electrical connections for motor 20 and clutch 14 will be described hereinafter. A second drum shaft SD2 is driven indirectly by shaft SD1 through the medium of appropriate gear drive mechanism (not shown) contained within a gear box 15 at one-half the angular velocity of shaft SD1. A third drum shaft SD3 is driven indirectly by main shaft SD1 through the medium of appropriate gear drive mechanism (not shown) contained within gear box 15 at one-sixth the angular velocity of main shaft SD1. It is preferable to employ a multiplicity of shafts which operate at different speeds in order to reduce the diameters and simplify the configuration of certain of the cams, hereinafter more particularly described, required to operate certain of the drum switches. Shaft SD1 is provided with a rigidly attached starwheel or indexing wheel 17 which cooperates with a positioning device 18, hereinafter more particularly described, to assuredly position the drum controller at each position and with three cams 30, 31 and 32 which are adapted to operate the drum switches DM, D1 and D2, respectively. Shaft SD2 is provided with three cams 33, 34 and 35 which are adapted to operate the drum switches D4, D8 and D16, respectively. Shaft SD3 is provided with two cams 36 and 37 which are adapted to operate the drum switches D32 and D64, respectively. It will be understood that each cam is rigidly attached to its respective shaft and is rotatable therewith and that each cam operates its respective drum switch through the medium of a suitable cam following device. Furthermore, each cam following device maintains the contact of its respective drum switch open when the cam following device rides on some projecting or "high" portion of the periphery of the cam. The general configuration of the cams and their approximate relationship to each other and to starwheel 17 when the drum controller is in the zero position is shown in Fig. 1. When the drum controller is rotated in the forward direction (i.e., in the direction of the arrows in Figs. 1 and 4) through all of its operating positions from zero through 100 the shaft SD1 makes five complete revolutions and approximately 317⅔° of a sixth revolution; shaft SD2 makes two complete revolutions and approximately 338⅚° of a third revolution; and shaft SD3 makes approximately 352%₁₀° of one revolution.

Referring again to starwheel 17, Fig. 4 best shows that the periphery thereof is provided with sixteen notches which are designated N0 through N15. The notches are spaced at equal radial angles about the periphery of starwheel 17 except that between notch N0 and N15 the radial angle is twice that of said equal radial angles. The notch N0 corresponds to the positions 0, 17, 34, 51, 68 and 85 of the drum controller. The raised portion on the periphery of starwheel 17 between notches N0 and N15 corresponds to positions 16, 33, 50, 67 and 84 which are shown in the schedule in Fig. 2 as points of major transition wherein the drum controller does not stop.

Positioning device 18, best seen in Figs. 4 and 5, comprises a magnet frame 18a which, among other things, adapts it for mounting on the supporting structure of the drum controller adjacent starwheel 17 and further comprises a solenoid coil 18b suitably arranged on the magnet frame, a plunger 18c which is adapted to be thrust forcefully toward the starwheel when the solenoid coil energized, a guide block 18d which is rigidly secured to the magnet frame, a roller carrier 18e which is slidably mounted on the guide block, and a roller follower 18f which is carried by the roller carrier. A compression spring 18g is disposed between a spring block 18h which is attached to plunger 18c and the roller carrier 18e. When the solenoid coil 18b is deenergized, spring 18g biases the roller follower 18f against the periphery of the starwheel 17. The force exerted by the spring 18g, however, is not sufficient to prevent the starwheel from rotating when intentionally moved. When the solenoid coil 18b is energized, plunger 18c is thrust toward the starwheel and moves the spring block to effect compression of spring 18g and thereby causing roller carrier 18e to force roller follower 18f firmly into one of the starwheel notches to afford accurate centering of the drum controller on a given position and to lock it in said position for as long as the solenoid coil is energized. Roller follower 18f is prevented from being "hung up" on a tooth of "high" portion between the notches of starwheel 17 in a manner which will hereinafter be explained. Use of positioning device 18 to achieve centering of the starwheel 17 is particularly advantageous in that a positive force is exerted against roller follower 18f by the solenoid plunger 18c and that force increases as the air gap in the solenoid is reduced thereby increasing the accuracy of the positioning of the starwheel. In former positioning devices which relied on a compression spring along to effect centering, the force exerted on the roller follower by the spring decreased as the spring decompressed, i.e., when the roller follower was forced into a notch of a starwheel.

When the drum controller is in the zero position, as shown in Fig. 1, roller follower 18f of positioning device 18 is engaged in the notch N0 of starwheel 17, as Figs. 1 and 4 show.

Cam 30 has sixteen "high" portions which correspond to and are in alignment with the sixteen notches in starwheel 17. Thus, when roller follower 18f of positioning device 18 is centered in a notch on starwheel 17 the cam 30 maintains the contact of drum switch DM open and when roller follower 18f is on a tooth or "high" point of starwheel 17 the cam 30 maintains the contact of drum switch DM closed. Thus, as will hereinafter appear, the solenoid coil 18b of positioning device 18 cannot normally be energized or pilot motor 20 be deenergized while the roller follower 18f is on a "high" portion (i.e., while contact DM is closed) and pilot motor 20 will continue to rotate shaft SD1 until the follower 18f is in engagement with the sides of a notch of starwheel 17 and the contact of drum switch DM is open. In one complete revolution cam 30 is adapted to effect closure of the contact of switch DM sixteen times, as Fig. 2 makes clear. Note that cam 30 maintains the contact of drum switch DM open on each drum position and closed between each drum position and closed through the drum positions 16, 33, 50, 67 and 84, which are points of major transition wherein the drum does not stop.

Cam 31 has eight notches and is adapted to effect closure of the contact of drum switch D1 eight times in one complete revolution of cam 31, as Fig. 2 makes clear. Note that the cam 31 maintains the contact of drum switch D1 open on alternate drum positions and on the points of major transition hereinbefore referred to.

Cam 32 has four notches and is adapted to effect closure of the contact of drum switch D2 four times in one complete revolution of cam 32, as Fig. 2 makes clear. Note that cam 32 maintains the contact of drum switch D2 alternatively open through two successive drum positions and closed through two successive drum positions and that it maintains the contact of drum switch D2 open on the points of major transition.

Cam 33 has four notches. Since, however, cam 33 is rotating at half the speed of cam 32 it is adapted to effect closure of the contact of drum switch D4 only twice during one revolution of shaft SD1 and therefore maintains the contact of drum switch D4 alternatively open through four drum positions and closed through four drum positions. Note that cam 33 maintains the contact of drum switch D4 open on the points of major transition.

Cam 34 has two notches and is adapted to effect closure of the contact of drum switch D8 only once during one revolution of shaft SD1. Cam 34, which is rotating at the same speed as cam 33, maintains the contact of drum switch D8 alternatively open through eight drum positions and closed through eight drum positions. Note that cam 34 maintains the contact of drum switch D8 open through the points of major transition.

Cam 35 may be considered as having only one notch or low point and rotates at the same speed as cams 33 and 34. Therefore, cam 35 maintains the contact of drum switch D16 alternatively open for one complete revolution of drum shaft SD1 and closed for one complete revolution thereof. Note that cam 35 maintains the contact of drum switch D16 open through the points of major transition.

Cam 36 may be considered as having only one notch or low point and rotates at one-sixth the speed of the cams on shaft SD1. Cam 36 is aligned with respect to the cams on shaft SD1 and SD2 so that it maintains the contact of drum switch D32 open during the first four complete revolutions of drum shaft SD1 and closed through each contact position for the fifth and a portion of the sixth rotation of the shaft SD1.

Cam 37 may be considered as having only one notch or low portion, and rotates at the same speed as cam 36. Cam 37 is aligned with respect to cam 36 so that it maintains the contact of drum switch D64 open during the first two complete revolutions of shaft SD1 and closed during the third, fourth, fifth and a portion of the sixth rotation of shaft SD1.

As hereinbefore noted, the drum controller cannot stop on the positions designated 16, 33, 50, 67 and 84, because the starwheel 17 is not provided with a notch on its periphery which would correspond to such positions. Furthermore, the cam 30 is provided with a notch on its periphery at the point which corresponds to such positions and therefore maintains its contact closed while passing therethrough during successive revolutions. The cams 31, 32, 33, 34 and 35 are provided with raised surfaces on their periphery at the points which correspond to such positions and therefore, as Fig. 2 makes clear, maintains the contacts of their respective drum switches open therethrough. It will be apparent, however, that cam 36 maintains the contacts of its respective drum switch closed when the controller passes through position 84 and that cam 37 maintains the contacts of its respective drum switch closed when the controller passes through positions 50, 67 and 84, thereby preventing excessive arcing by preventing successive reopening and reclosure of certain of the commutating contacts as will hereinafter appear. Note that the relatively small values of resistance inserted at positions 50, 67 and 83 prevent excessive reduction in driving torque in motor 10 when the drum is moved through those points.

The armature 20a of pilot motor 20 is connected on one side to line L2 and is connectable on its other side to line L1 for forward and reverse rotation, respectively, either through a field winding 20b and a normally open contact 21b of an electroresponsive relay 21 or through a field winding 20c and a normally open contact 22b of an electroresponsive relay 22. The solenoid coil 14a of solenoid clutch 14 is connected in parallel with armature 20a of pilot motor 20 and is energizable therewith to cause clutch 14 to mehcanically connect motor 20 to shaft SD1 of the drum controller. One side of the operating coil 21a of relay 21 is connectable to line L1 through the normally open contact 24a of a Forward pushbutton switch 24 and the other side thereof is connected to line L2. One side of the operating coil 22a of relay 22 is connectable to line L1 through the normally open contact 25a of a Reverse pushbutton switch 25 and the other side thereof is connected to line L2. The normally open contacts 21c and 21d of relays 21 and 22, respectively, are connected in series with each other between a point common between contact 24a and coil 21a and a point common between contact 25a and coil 22a. The said other side of the contact of drum switch DM, hereinbefore referred to, is connected to a point common between contacts 21c and 22c. Thus, whenever relay 21 or 22 is energized in response to closure of its respective pushbutton, that relay does not deenergize when its respective pushbutton is opened if the contact of drum switch DM is closed. The solenoid coil 18b of positioning device 18 is connectable to line L1 through the normally closed contacts 21d and 22d of the relays 21 and 22, respectively, and is connected on its other side to line L2. Solenoid coil 18b is adapted to be normally energized and to be deenergized when either relay 21 or 22 is energized.

With the control system and the drum controller in the condition depicted in Fig. 1 it may be assumed that motor 10 is deenergized and that the drum controller is at rest in the zero operating position. Let it be assumed that it is desired to operate the main motor 10 and to accelerate its speed by the commutation of its secondary resistor by operation of the drum controller in the "forward" direction, i.e., by effecting rotation of the shafts SD1, SD2 and SD3 in the direction of the arrows shown in Fig. 1. Further, assume that lines L1, L2 and L3 are energized and that disconnect switch KS is closed. When lines L1 and L2 are energized, an energizing circuit is established for positioning device 18 from lines L1 to L2, through the normally closed contacts 22d and 21d of the reverse relay 22 and the forward relay 21, respectively, and through the solenoid coil 26b. With positioning device 18 thus energized plunger 18c is thrust toward starwheel 17 to compress spring 18g and to force roller follower 18f into notch N0 of the starwheel. Thus, the drum controller is accurately positioned on the zero speed point and is locked against rotation.

Motor 10 is energized by closure of switch 12 to effect closure of contact 12a and remains energized as long as contact 12a is closed. Upon closure of contact 12a operating coil 11a of electroresponsive contactor 11 is energized to effect closure of contacts 11b, 11c and 11d thereby connecting the primary winding P of motor 10 to the lines L1, L2 and L3. Since the drum controller is on the zero position the total resistance in each of resistance networks RN1, RN2 and RN3 is 127 ohms and the motor 10 operates in its lowest speed.

Operation of the drum controller in the "forward" direction is initiated by depression of pushbutton 25 which effects closure of contact 24a and establishes an energizing circuit for the operating coil 21a of relay 21. Energization of forward relay 21 effects closure of contacts 21b and 21c and opening of contact 21d. Closure of contact 21c has no immediate effect. Opening of contact 21d effects deenergization of the solenoid coil 18b of positioning device 18 and solenoid plunger 18e releases the pressure on spring 18g. Roller follower 18f is now held in notch N0 under normal spring bias when a force which is insufficient to prevent rotation of the drum controller by motor 20. Closure of contact 21b establishes an energizing circuit for pilot motor 20 for rotation in the forward direction from line L1 to L2 through control 21b, forward field winding 20b and motor armature 20a and establishes an energizing circuit for the solenoid coil 14a of solenoid clutch 14 to connect motor 20 to shaft SD1. So long as pushbutton switch 25 is maintained depressed positioning device 18 will remain deenergized, clutch 14 will remain energized and pilot motor 20 will rotate in the forward direction and each shaft SD1, SD2 and SD3 will rotate in the direction of the arrows shown in Fig. 1.

Rotation of the drum controller in the forward direction effects operation of the drum switches in accordance with the schedule shown in Fig. 2.

In moving from position 0 to position 1 drum switch DM momentarily closes but with no immediate effect. On position 2 drum switch DM is open and drum switch D1 is closed. Closure of drum switch D1 esablishes an energizing circuit for commutating relay CR2 from line L1 to L2 through contact D1, member T2 of transfer relay 13, and operating coil CR2a. Energization of commutating relay CR2 effects closure of commutating contact CR2b and resistor R2 is shunted. The total ohmic value of resistance network RN1 decreases by the ohmic value of resistance unit R2 namely, two ohms. Only 125 ohms remain in circuit in network RN1 and the speed of motor 10 increases proportionately.

In moving from position 1 to position 2, drum switch DM momentarily closes but with no immediate effect. On position 2 drum switch DM is open, drum switch D1 is open and drum switch D2 is closed. Opening of drum switch D1 effects deenergization of commutating relay CR2 and contact CR2b opens to place resistor R2 back in circuit. It is to be understood, of course, that the resistance units (not shown) in networks RN2 and RN3 are being commutated as in network RN1 so that the resistance values across each phase winding of motor 10 are the same. Closure of drum switch D2 establishes an energizing circuit for commutating relay CR4 from line L1 to L2 through contact D2, member T4 of transfer relay 13 and operating coil CR4a. Energization of commutating relay CR4 effects closure of commutating contact CR4b and resistor R4 is shunted. The total ohmic value of network RN1 decreases by four ohms and only 123 ohms remain in circuit.

It will be apparent to those skilled in the art that continued rotation of the drum controller in the forward direction as far as position 32 will effect further operation of the drum switches with the resultant operation of the commutating relays and decrease in resistance by increments of two ohms in the above described manner, as shown in the schedule in Fig. 2. It is to be noted that in the interval between the opening of the contact of switch D1 and the closing of the contact D2 (i.e., between drum operating positions 1 and 2) that all of the resistance in network RN1, RN2 and RN3 is momentarily connected and the value thereof in each network is 127 ohms. With the relatively high resistance still in circuit with motor 10, however, the momentary reduction in the torque of motor 10 effected by reinsertion of all resistance is not significant. Similarly, the full 127 ohms is inserted in each network RN1, RN2 and RN3 in moving between positions 3 and 4, positions 7 and 8 and positions 15 and 17 (note that position 16 is a point of major transition wherein the controller does not stop).

When the drum controller is on position 32 the drum contact DM is open, the drum switches D1, D2, D4, D8 and D16 are closed, and a total of 65 ohms remain in network RN1. As the drum moves through position 33, which is also a point of major transition and one of the positions wherein it cannot stop, all 127 ohms of resistance is again momentarily placed in the circuit of network RN1. When the drum controller is on position 34 the cam 37 effects closure of drum switch D64 which establishes an energizing circuit for commutating relay CR64 and transfer relay 13 from line L1 to L2 through the contact of drum switch D64 and through operating coils CR64a and 13a of the commutating relay CR64 and transfer relay 13, respectively. As the schedule in Fig. 2 shows, the cam 37 will maintain drum switch D64 closed for the remaining drum positions in the forward direction. Energization of commutating relay CR64 effects closure of contact CR64b and shunting of resistance unit R64 to leave 63 ohms in network RN1. Energization of transfer relay effects movement of movable contact members T1, T2, T4, T8, T16 and T32 from the position shown in Fig. 1 to their other operating positions hereinbefore described, which at this moment has no immediate effect. When the drum controller is moved to position 35, the drum contact D1 closes but affords a different effect than was afforded on its previous closure. Closure of drum contact D1 with transfer relay 13 energized establishes an energizing circuit for commutating relay CR1 from line L1 to L2 through contact D1, member T1 of transfer relay 13, and operating coil CR1a. Energization of commutating relay CR1 effects closure of commutating contact CR1b and resistor unit R1 is shunted. Now only 62 ohms remain in circuit in network RN1. Since the transfer relay 13 will remain energized for as long as drum switch D64 is closed continued operation of the drum controller in the forward direction to its highest position will effect further operation of the drum switches with the resultant operation of the commutating relays and a decrease in resistance in network RN1 by increments of one ohm in the above described manner, as shown in the schedule in Fig. 2. When the drum controller passes through positions 50 and 67, which are points of major transition wherein it does not stop, it will be seen that since switch D64 remains closed, a total of 63 ohms is momentarily inserted into the network RN1, and at position 84 since switches D64 and D32 remain closed, a total of 31 ohms is momentarily inserted in circuit. On operating position 100 all drum switches are closed and all resistance is shunted from the network RN1.

To stop the drum controller at any operating position the Forward pushbutton 24 is released to reopen contact 24a thereof thereby normally effecting deenergization of operating coil 21a of relay 21. Upon deenergization of relay 21 contact 21b opens to interrupt the energizing circuit for pilot motor 20 and solenoid clutch 14, contact 21d recloses to establish an energizing circuit for positioning device 18 from line L1 to L2 through contact 22d of relay 22, contact 21d of relay 21 and solenoid coil 18b of positioning device 18, and contact 21c opens without immediate effect. Upon energization of positioning device 18 the roller follower 18f thereof is forced into one of the notches of starwheel 17 to accurately center the drum controller on an operating position and to lock it thereon, as hereinbefore explained.

If, however, the Forward pushbutton 24 is released and contact 24a thereof opens while roller follower 18f of positioning device 18 is riding on a tooth or high spot of starwheel 17 it will be apparent that energization of positioning device 18, even if possible, would not effect the desired positioning. Therefore, as hereinbefore explained, when roller follower 18f is on a high spot the cam 30 maintains drum switch DM closed. With drum switch DM closed, opening of pushbutton contact 24a does not effect deenergization of the operating coil 21a of the relay 21 because an energizing circuit therefor is maintained from line L1 to L2 through the closed contact of drum switch DM, the closed contact 21c of relay 21 and the operating coil 21a. Relay 21 will remain energized and pilot motor 20 will continue to rotate until the contact of drum switch DM opens and when it opens the operating relay 21 will deenergize with the effects hereinbefore described. The contact of drum switch DM will open, however, only when roller follower 18f of positioning device 18 is in a notch of starwheel 17. When the drum controller stops on a position the motor 10 will operate at a speed determined by the value of resistance of the unshunted resistance in the networks.

It will be apparent to those skilled in the art, that the drum controller can be rotated in the reverse direction toward operating position 0 by effecting energization of the relay 22 which operates in substantially the same manner as relay 21 and can be stopped by effecting deenergization of the relay 22.

I claim:

1. In a control system for commutating resistance, in combination, a resistance network comprising a multiplicity of resistance units, a shaft, a pilot motor energizable to rotate said shaft, an electroresponsive clutch for connecting said motor to said shaft when said motor is energized, means for energizing said pilot motor and for deenergizing the same, an element on said shaft having means defining for said shaft a multiplicity of definite operating positions, a reciprocably movable member for engagement with said element, electroresponsive means for effecting movement of said member to accurately position said element and said shaft in any one of said operating positions upon deenergization of said pilot motor, a multiplicity of cams rotated by said shaft, and a switch adapted to be operated by each of said cams, certain of said switches adapted to effect commutation of said resistance units, and one of said switches adapted to maintain said pilot motor energized and for rendering said electroresponsive means ineffective to move said member upon initiation of deenergization of said pilot motor in the event that said movable member is not in position with respect to said element to effect accurate positioning thereof, said one of said switches further adapted to effect deenergization of said pilot motor and to cause said electroresponsive means to move said member when said member is in position with respect to said element to effect accurate position thereof.

2. In a control system for commutating resistance, in combination, a resistance network comprising a multiplicity of serially connected resistance units having ohmic values which vary in geometric progression, a shaft, a pilot motor energizable to rotate said shaft in reverse directions, an electroresponsive clutch for connecting said motor to said shaft when said motor is energized, means for energizing said pilot motor and for deenergizing the same, an element on said shaft having means defining for said shaft a multiplicity of definite operating positions, a reciprocably movable member for engagement with said element, electroresponsive means for effecting movement of said member to accurately position said element and said shaft in any one of said operating positions upon deenergization of said pilot motor, a multiplicity of cams rotated by said shaft, and a switch adapted to be operated by each of said cams in accordance with a predetermined schedule determined by the shape of each cam, certain of said switches adapted to effect exclusion and inclusion of said resistance units of said network to afford a resistance taper wherein the change in ohmic value between each operating position of said shaft is a predetermined value for one portion of the taper and over another portion of the taper is a fraction of said predetermined value, and another of said switches adapted to maintain said pilot motor energized and for rendering said electroresponsive means ineffective to move said member upon initiation of deenergization of said pilot motor in the event that said movable member is not in position with respect to said element to effect accurate positioning thereof, said another of said switches further adapted to effect deenergization of said pilot motor and to cause said electroresponsive means to move said member when said member is in position with respect to said element to effect accurate positioning thereof.

3. The combination according to claim 2 including electroresponsive means operable in response to operation of one of said certain of said switches to cause the remainder of said certain switches to effect exclusion and inclusion of said resistance units thereby providing the said portion of the resistance taper wherein the change in ohmic value between each operating position of said shaft is a fraction of said predetermined value.

4. In a control system for commutating resistance, in combination, a resistance network comprising serially connected resistance units having ohmic values which vary in geometric progression, a shaft, means for initiating rotation of said shaft in steps through a multiplicity of operating positions in reverse directions and for stopping the same, a multiplicity of cams rotatable by said shaft, switches operable by said cams, certain of said switches adapted to effect exclusion and inclusion of said resistance units from said network in a predetermined sequence to provide a resistance taper wherein ohmic value between each shaft position over one portion of the taper is a given value and over another portion thereof is a fraction of said given value, and positioning means responsive to initiation of stopping of said shaft to accurately center the latter at a given operating position, said means including a cam operated switch responsive to shaft position to effect operation of said positioning means.

5. In a control system for commutating resistance, in combination, a resistance network comprising serially connected resistance units having ohmic values which vary in geometric progression, a shaft, means for initiating rotation of said shaft in steps through a multiplicity of operating positions in reverse directions and for stopping the same, an element on said shaft having means defining for said shaft a multiplicity of definite operating positions, a reciprocably movable member for engagement with said element, a multiplicity of cams rotatable by said shaft, switches operable by said cams, certain of said switches adapted to effect exclusion and inclusion of said resistance units from said network in a predetermined sequence to provide a resistance taper wherein ohmic value between each shaft position over one portion of the taper is a given value and over another portion thereof in a fraction of said given value, and positioning means operable in response to initiating of stopping said shaft to cause said movable member to cooperate with said element to accurately center said shaft on a definite operating position, said positioning means including a cam operated switch responsive to shaft position to effect operation of said positioning means to maintain said shaft in rotation until said movable member is in a position with respect to said element to accurately position said shaft.

6. In a control system for commutating resistance, in combination, a resistance network comprising serially connected resistance units having ohmic values which vary in geometric progression, a shaft, means for initiating rotation of said shaft in steps through a multiplicity of operating positions in reverse directions and for stopping the same, an element on said shaft having means defining for said shaft a multiplicity of definite positions, a reciprocably movable member for engagement with said element, a multiplicity of cams rotatable by said shaft, switches operable by said cams, certain of said switches adapted to effect exclusion and inclusion of said resistance units from said resistance network upon rotation of said shaft a predetermined angular distance thereby affording a resistance taper wherein the change in ohmic value between each operating position of said shaft is a predetermined value, means operable in response to operation of one of said certain switches to cause the remainder of said certain switches to effect exclusion and inclusion of said resistance units from said resistance network upon rotation of said shaft a further predetermined angular distance thereby affording a resistance taper wherein the change in ohmic value between each operating position of said shaft is a fraction of said predetermined value, and means operable in response to initiation of stopping said shaft to cause said movable member to cooperate with said element to accurately center said shaft on a definite operating position, said means including a cam operated switch operable to maintain said shaft in rotation until said movable member is in a position with respect to said element to accurately position said shaft.

7. In a control system for commutating resistance, in combination, a resistance network comprising serially connected resistance units having ohmic values which vary in geometric progression with a ratio of two, a pilot motor, means for initiating energization of said motor for rotation in reverse directions and for effecting deenergization thereof, a shaft rotatable by said motor when the latter is energized, an element on said shaft having means defining for said shaft a multiplicity of definite operating positions, a reciprocably movable member for engagement with said element, first electroresponsive means normally energizable upon initiation of deenergization of said pilot motor to cause said member to accurately position said element and shaft in any one of said operating positions, a multiplicity of cams rotatable by said shaft, a switch member adapted to be operated by each of said cams in accordance with a schedule determined by the shape of each cam, one of said switches adapted to maintain said first electroresponsive means deenergized and said pilot motor energized upon initiation of deenergization of said pilot motor in the event said movable member is not in proper position to effect accurate positioning of said element and to effect energization of said first electroresponsive means and deenergization of said pilot motor when said movable member is in said proper position, the others of said switches normally adapted to effect exclusion and inclusion of said resistances from said network to provide a resistance taper wherein ohmic value between each operating position is a fixed value, and second electroresponsive means energizable in response to operation of one of said other switches to reconnect the remainder of said other switches whereby said remainder of said other switch effects exclusion and inclusion of said resistance from said network to provide a resistance taper wherein ohmic value between each operating position is one-half of said fixed value.

8. In combination, a switching controller having a rotatable operating shaft, a motor for driving said shaft, an element on said shaft having means defining for said shaft a plurality of definite, rotary spaced operating positions, a reciprocably movable member normally biased into engagement with said element, electroresponsive means energizable to cause said member to cooperate with said element and the means thereof to accurately position said shaft in any one of its operating positions, and means for controlling the energization and deenergization of said motor and said electroresponsive means comprising means acting to insure energization of said electroresponsive means upon deenergization of said motor.

9. The combination according to claim 8 including coordinated means responsive to position of said shaft and said member for preventing deenergization of said motor and energization of said electroresponsive means unless said member is in position to cooperate with said element to accurately position said shaft.

10. In combination, a switch controller having a rotatable operating shaft, a motor for driving said shaft, an electroresponsive clutch for connecting said motor to said shaft when said motor is energized, an element on said shaft having means for defining for said shaft a plurality of definite, rotary spaced operating positions, a reciprocably movable member normally biased into engagement with said element, electroresponsive means energizable to cause said member to cooperate with said element and the means thereof to accurately position said shaft in any one of its operating positions, and means for controlling the energization and deenergization of said motor and said electroresponsive means comprising means acting to insure energization of said electroresponsive means upon deenergization of said motor.

11. In a control system for commutating resistance, in combination, a rotatable shaft, a multiplicity of cams rotatable by said shaft, a switch adapted to be operated by each cam, a resistance network comprising a multiplicity of serially connected resistance units equal in number to the number of switches employed and having ohmic values which vary in geometric progression with a ratio of two, a commutating relay for each resistor energizable to shunt the latter from said network, and a transfer delay adapted to be energized along with the commutating relay for the resistance unit of greatest ohmic value upon closure of one of said drum switches, said transfer relay when energized maintaining all commutating relays connected for energization by respective drum switches and when deenergized effecting disconnection of the commutating relay for the resistance unit of lowest ohmic value and transferring connection of the remaining commutation relays except the commutation relay for the resister of highest ohmic value to other switches.

12. In combination, an induction motor having a polyphase rotor, a resistance network having phase groups connected to said rotor, each of said phase groups including a multiplicity of serially connected resistance units having ohmic values which vary in geometric progression, and means for shunting said resistance units to obtain a resistance taper wherein total ohmic value of each phase group changes in increments of predetermined ohmic value over one portion of said taper and change in increments equal to a fraction of said predetermined ohmic value over another portion thereof.

13. The combination according to claim 12 wherein said predetermined ohmic value is the ohmic value of the resistance unit having the next to lowest value and said fraction of said predetermined ohmic value is the ohmic value of the resistance unit having the lowest value.

References Cited in the file of this patent

UNITED STATES PATENTS

| | | |
|---|---|---|
| 2,672,579 | Jochem | Mar. 16, 1954 |
| 2,676,289 | Wulfsberg et al. | Apr. 20, 1954 |
| 2,742,599 | Schweighofer | Apr. 17, 1956 |
| 2,760,138 | Colby | Aug. 21, 1956 |